US008928453B2

(12) United States Patent
Sprenger et al.

(10) Patent No.: US 8,928,453 B2
(45) Date of Patent: Jan. 6, 2015

(54) MECHATRONIC LOCKING APPARATUS

(75) Inventors: Detlef Sprenger, Siebnen (CH); Andreas Münger, Jona (CH)

(73) Assignee: Assa Abloy (Schweiz) AG, Richterswil (CH)

( * ) Notice: Subject to any disclaimer, the term of this patent is extended or adjusted under 35 U.S.C. 154(b) by 235 days.

(21) Appl. No.: 13/258,880

(22) PCT Filed: Mar. 1, 2010

(86) PCT No.: PCT/CH2010/000048
§ 371 (c)(1),
(2), (4) Date: Sep. 22, 2011

(87) PCT Pub. No.: WO2010/111796
PCT Pub. Date: Oct. 7, 2010

(65) Prior Publication Data

US 2012/0011907 A1 Jan. 19, 2012

(30) Foreign Application Priority Data

Mar. 30, 2009 (CH) .................................... 00500/09

(51) Int. Cl.
*G05B 19/00* (2006.01)
*G07C 9/00* (2006.01)

(52) U.S. Cl.
CPC ........ *G07C 9/00111* (2013.01); *G07C 9/00944* (2013.01)
USPC ........... 340/5.1; 340/5.21; 340/5.6; 340/5.73; 340/5.82; 320/109; 320/114; 307/9.1; 70/278.3

(58) Field of Classification Search
CPC ...................................................... B60R 25/04
USPC .................. 340/5.2, 5.21, 5.6, 5.73; 307/9.1; 320/109, 114; 70/278.3, 278.7
See application file for complete search history.

(56) References Cited

U.S. PATENT DOCUMENTS 5,826,450 A * 10/1998 Lerchner et al. ............. 70/278.3
8,035,477 B2 * 10/2011 Kirkjan ........................ 340/5.21
8,141,399 B2 * 3/2012 Hyatt, Jr. ..................... 70/278.3
(Continued)

FOREIGN PATENT DOCUMENTS

EP 0743411 A2 11/1996
JP 2004-293244 A 10/2004
(Continued)

OTHER PUBLICATIONS

Japanese Notification for Reason for Refusal for Appln. No. 2012-502410 dated Jul. 16, 2013.

*Primary Examiner* — Jeffery Hofsass
*Assistant Examiner* — Israel Daramola
(74) *Attorney, Agent, or Firm* — Brody and Neimark, PLLC

(57) ABSTRACT

The mechatronic locking apparatus comprises a control circuit (4), from which information signals can be transmitted to a control circuit (6) of the lock cylinder (2) using a first communication path (5). A security key (3) has at least one second communication path (7) for storing and/or processing access data. The two communication paths (5, 7) are connected to said control circuit (4) of the security key (3). The first communication path (5) preferably uses an electrical contact in the lock cylinder (2). The second communication path (7) comprises a transponder (8). The first communication path (5) may also be used for power supply purposes.

12 Claims, 3 Drawing Sheets

(56) References Cited

U.S. PATENT DOCUMENTS

| | | | | |
|---|---|---|---|---|
| 8,228,030 | B2 * | 7/2012 | Pukari et al. | 320/114 |
| 8,284,023 | B2 * | 10/2012 | Coutermarsh et al. | 340/5.73 |
| 8,368,507 | B2 * | 2/2013 | Conreux et al. | 340/5.2 |
| 8,468,861 | B2 * | 6/2013 | Pukari et al. | 70/278.7 |
| 8,487,584 | B2 * | 7/2013 | Taylor-Haw et al. | 320/109 |
| 8,643,469 | B2 * | 2/2014 | Haberli | 340/5.82 |
| 2004/0222699 | A1 * | 11/2004 | Bottomley | 307/9.1 |
| 2005/0007799 | A1 | 1/2005 | Schreiber et al. | |
| 2005/0077995 | A1 * | 4/2005 | Paulsen et al. | 340/5.6 |
| 2005/0285716 | A1 | 12/2005 | Denison et al. | |
| 2007/0132550 | A1 * | 6/2007 | Avraham et al. | 340/5.21 |

FOREIGN PATENT DOCUMENTS

| | | | |
|---|---|---|---|
| JP | 2010-203565 | A | 2/2010 |
| WO | WO 2005013181 | A2 | 2/2005 |
| WO | WO 2006056085 | A1 | 6/2006 |
| WO | WO 2007073608 | A1 | 7/2007 |
| WO | WO 2009036585 | A1 | 3/2009 |

* cited by examiner

MECHATRONIC LOCKING APPARATUS

FIELD

The invention relates to a mechatronic locking apparatus (i.e., mechanical electrical) having a lock cylinder and an associated security key which has a control circuit from which information signals can be transmitted to a control circuit of the lock cylinder via a first communication path.

BACKGROUND

A mechatronic locking apparatus of this kind has been disclosed, for example, in WO 2007/073608 by the same applicant. Information signals can be transmitted to the control circuit of the rotary lock cylinder by means of the control circuit. Signals are transmitted via an electrical contact element which is arranged in the keyway of the rotary lock cylinder. One significant advantage of a locking apparatus of this kind is that increased security is possible by virtue of an electronically secured user identification means. A user identification means of this kind can result in it being possible to operate the rotor using the inserted key only by providing a predetermined item of electronic information. The rotor is unlocked, for example, by means of an actuator which has a blocking element which can be moved between a blocking position and an unblocked position by a motor.

The rotary lock cylinder of a locking apparatus of this kind can be operated in a "stand-alone" manner or in a networked manner. A networked system having a plurality of mechatronic locking apparatuses is disclosed in WO 2006/056085 by the same applicant. This system has a computer having software for monitoring access authorizations and having at least one database containing data relating to the access authorizations. The data generally comprises the names of the authorized users, a list of the locking apparatuses to which these users have access, and information, for example, for time windows within which these users are authorized to gain access. Systems of this kind make it possible for mutations to be made from a control center in a simple and quick manner via a network.

US 2005/0077995 discloses a locking apparatus having a key with which user-specific data is transmitted to the lock cylinder when the key is inserted into the lock cylinder. The user-specific data is that from a fingerprint sensor which is arranged on the grip of the key. The lock cylinder can be operated when the user-specific data has been identified as authorized and, in addition, the rotor is mechanically unblocked by the key. The user-specific data is transmitted from the key to the lock cylinder by means of an electrical contact in the lock cylinder or in a contactless manner. A locking apparatus in which the locking security is likewise intended to be increased by means of data from a fingerprint sensor has also been disclosed by WO 2005/013181. The locking apparatus according to EP-A-0743411 has also disclosed that an electronic code generator is arranged in the key and an electronic code evaluation means is arranged in the cylinder housing. The code is transmitted using a transponder and a transponder reading device. WO 2009/036585 discloses a lock device which has an electronic module for receiving data from an identification unit and an electric motor for operating the blocking and/or coupling device. In the event of operation, the electric motor acts as a generator in order to charge the energy storage means for the electronic module.

SUMMARY

The invention is based on the object of providing a locking apparatus of said type which is even more suitable for such systems.

In the case of a locking apparatus of this generic type, the object is achieved in that the security key has at least a second communication path for the purpose of storing and/or processing access data. In the locking apparatus according to the invention, the security key has at least two communication paths. The first communication path is created by means of an electrical contact in the lock cylinder. A significant advantage of the apparatus according to the invention is that it is also possible to supply power via this first communication path. This can be performed, in particular, by means of a battery which is arranged in the security key. However, the battery can, in principle, also be arranged in the lock cylinder. The two communication paths are each connected to the control circuit of the security key. The locking apparatus according to the invention can also be an electronically secured lock cylinder which does not have any mechanical security means, that is to say does not contain bolts and pins as is otherwise customary.

The second communication path is RFID-based and allows data to be read and input into the control circuit of the security cylinder in a contactless manner by means of a read device or write device. Therefore, in the case of the locking apparatus according to the invention, communication is possible via two paths. The data in the control circuit which is arranged on the security key can be used via the two communication paths and therefore both via RFID and also via the electrical contact in the lock cylinder. Irrespective of the communication path, the access data can be processed via a circuit. This is also true of other data. This data can be written, read and changed both via the first and via the second communication path, and also centrally stored and managed.

According to a development of the invention, provision is made for the control circuit in the lock cylinder to be performed by means of bidirectional communication.

Power is also supplied via the same electrical connection. In addition, provision is made for the control circuit of the lock cylinder to communicate with the control circuit of the security key by means of a modulated current.

According to a development of the invention, provision is made for the data to be transmitted in encrypted form via the first and via the second communication path, and also to be stored in encrypted form. Provision is also made, according to one development of the invention, for the security key to contain an identification and/or authentication mechanism. The data for identification and authentication are preferably transmitted and stored in encrypted form.

According to one development of the invention, provision is made for the control circuit which is arranged in the key to have a clock which can be read from and changed via the two communication paths. The authorization for manipulation is therefore possible by means of data management via the two communication paths.

Further advantageous features can be found in the dependent patent claims, the following description and the drawings.

BRIEF DESCRIPTION OF THE DRAWINGS

An exemplary embodiment of the invention will be explained in greater detail below with reference to the drawings, in which.

DETAILED DESCRIPTION

Figure 1:
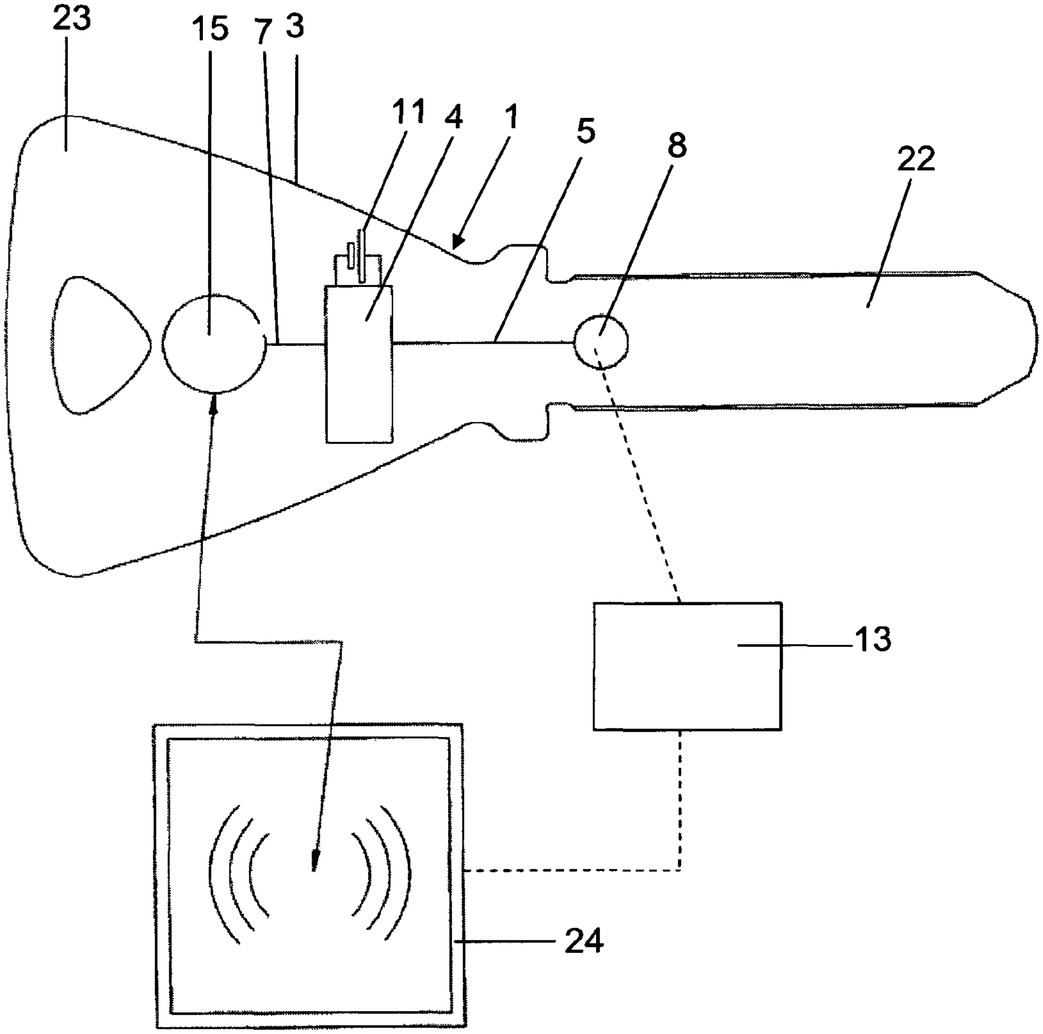
FIG. 1 schematically shows a locking apparatus according to the invention.
Figure 2:
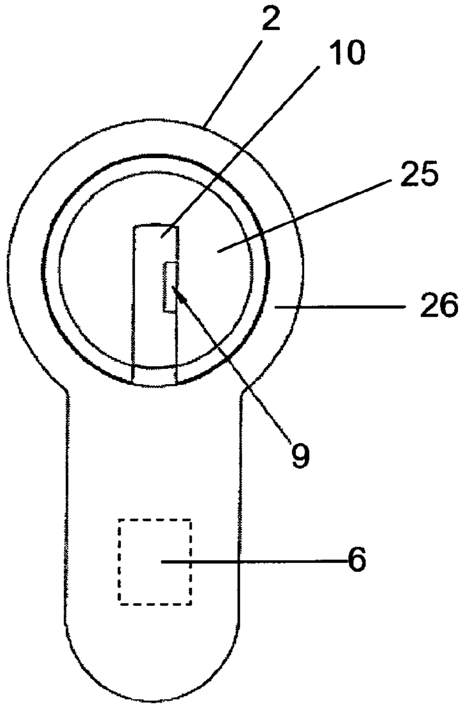
FIG. 2 shows a view of the front face of a lock cylinder of the locking apparatus according to the invention.

The locking apparatus 1 according to the invention has, according to FIG. 1, a security key 3 which has a shank 22 and a grip 23. The security key 3 is used to operate the lock cylinder 2 which is shown in FIG. 2. Said lock cylinder has a rotor 25 and a stator 26 for enabling the rotor 25 to rotate, for which purpose the shank 22 of the key is inserted into a keyway 10 in the rotor. In this case, tumblers (not shown here) are arranged in a manner which is known per se.

A control circuit 4 which is fed by an energy source 11, in particular a battery, is arranged in the grip 23 of the key 3. The control circuit 4 and the energy source 11 are arranged, for example, in a recess (not shown here) in the grip 23 and covered by a cover or the like (not shown here). The control circuit 4 is used, in particular, for storing and processing access data. This access data can be written to the control circuit 4, read from said control circuit and changed by means of a control center 13, for example by means of a laptop. This data can be stored and managed in the control center 13. Communication for these processes is possible via two paths. Said paths will be described in greater detail below.

The first path, via which the control center 13 can communicate with the control circuit 4, has a first communication path 5 which connects the control circuit to a contact means 8 which is arranged on the security key 3. This contact means 8 is, for example, a contact plate which is arranged on the outside at the rear end of the shank 22. If the shank 22 is inserted into the keyway 10, the contact means 8 is electrically connected to a contact means 9 which, according to FIG. 2, is arranged like in the keyway 10. This first communication path 5 is formed by a signal line which connects the control circuit 4 to the contact means 8. Said signal line runs in the key 3. The contact means 9 is connected to a control circuit 6 which, according to FIG. 2, is arranged in the stator 26. Said control circuit 6 controls, for example, an actuator which is described, for example, in WO 2007/073608. If the shank 22 is inserted into the keyway 10, the control circuit 4 transmits the authorization data to the control circuit 6 via the first communication path 5. This data is checked in the control circuit 6. If authorization is granted, the actuator is accordingly operated.

If the security key is a reversible key, both sides of the key or both sides of the keyway are provided with an electrical contact element.

Figure 3:
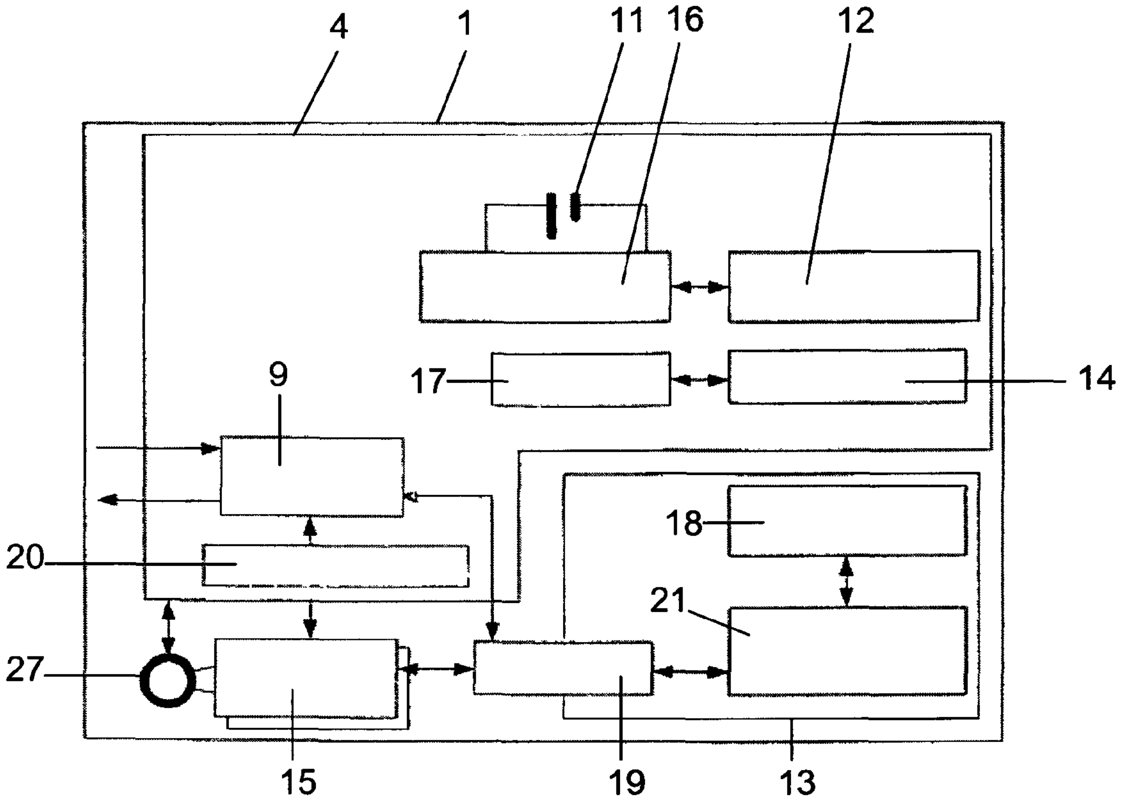
FIG. 3 shows a circuit diagram of the locking apparatus according to the invention.

The second path has a second communication path 7 which connects the control circuit 4 to a transponder 15 which is known per se and which is likewise arranged in the grip 3. This transponder 15 has an antenna 27 (FIG. 3) which is known per se and which allows contactless communication with a read device 24. The transponder 15 allows RFID-based transmission of data between the circuit 4 and the control center 13 which is connected to the read device 24 for signal transmission. This read device 24 can be used to read data from, input data into and change data in the control circuit. In addition, the data in the control center 13 can be stored and then managed in said control center by means of the read device 24. Therefore, in the locking apparatus according to the invention, data transmission is possible by means of the contacts 8 and 9, and RFID-based data transmission or communication is also possible. As mentioned above, feeding via the first communication path 5 is possible. In addition, energy can be supplied via the antenna 27 of the transponder 15 or via RFID. As shown in FIG. 3, a power control means 16 which is connected to the energy source 11 and to a voltage converter 12 is provided. This power control means 16 switches at least parts of the circuit 4 on and off in order to keep the energy consumption as low as possible. Many batteries have, on account of their internal resistance, a large voltage drop at current peaks. The voltage converter 12 makes it possible to compensate for a voltage drop in the battery. In order to reduce the quiescent current, the voltage converter 12 is preferably switched off in the inoperative state. When the key 3 is inserted into the lock cylinder 2, the voltage converter 12 is switched on and compensates. The voltage drop which was caused by the current peaks. According to FIG. 3, the control circuit 4 has a system detector 20 which switches on the respectively required process. The switch-on operation is performed on the basis of the relevant system and therefore selectively via the first communication path 5 or via the second communication path 7. The system detector 20 is accordingly connected to the contact means 9 or to the transponder 15.

The circuit 4 also has encryption means 17 and a clock 14. The clock 14 is protected by the encryption means 17. The clock 14 can be read from and changed both via the first communication path 5 and via the second communication path 7. The authorization for manipulation of the clock 14 is controlled by the data processing means.

The control center 13 is likewise protected by an encryption means 19. Said control center has at least one data storage means 18 and means for data management 21. The control center 13 can, as shown, communicate with the control circuit 4 via the first communication path 5 or via the second communication path 7. In addition, a firmware update can be carried out via the first communication path 5 and via the second communication path 7.

Communication is performed by means of the second communication path 7 in accordance with the respectively indicated standards of the transponder technology used. One or more RFID technologies can be processed, for example, at frequencies of 13.56 MHz or 125 kHz. The control circuit 4 can be directly connected to the RFID antenna 27 and communicate via said RFID antenna.

Provision is made for the storage and processing of the following data and characteristics in particular:

- uniqueness numbers
- access authorizations
- time zones
- time windows
- block lists/withdrawal of authorization
- status information
- history information
- segmentation of data for third party users
- grouping of users

LIST OF REFERENCE SYMBOLS

1 Locking apparatus
2 Lock cylinder
3 Security key
4 Control circuit
5 First communication path
6 Control circuit
7 Second communication path
8 Contact means
9 Contact means

10 Keyway
11 Energy source
12 voltage converter
13 Control center
14 Clock
15 Transponder
16 Power control means
17 Encryption means
18 Data storage means
19 Encryption means
20 System detector
21 Data processing means
22 Shank
23 Grip
24 Read device
25 Rotor
26 Stator
27 Antenna
(RFID antenna)

The invention claimed is:

1. A mechatronic locking apparatus comprising:
a lock cylinder comprising a cylinder control circuit;
an associated security key comprising:
a first communication path;
a key control circuit for storing and processing access data and from which information signals can be transmitted to the cylinder control circuit via the first communication path, and
at least a second communication path for the purpose of storing and/or processing access data, wherein the first and second communication paths are connected to said key control circuit of the security key,
wherein the access data can be written, read and changed both via the first communication path and via the second communication path,
wherein the security key comprises electrical contact elements and the rotary lock cylinder comprises electrical contact elements, said first communication path formed by a signal line directly connecting said key control circuit to said electrical contact elements providing the first communication path, wherein said electrical contact elements of the security key are in contact with electrical contact elements of the rotary lock cylinder, to allow signal transmission between the key control circuit and the lock control circuit, when the key is inserted into a keyway in the lock cylinder, and
wherein the second communication path comprises a signal line directly connecting a transponder to said key control circuit.

2. The locking apparatus as claimed in claim 1, wherein said first and second contact element are provided both for signal transmission and for feeding power to the control circuit of the lock cylinder by means of an energy source.

3. The locking apparatus as claimed in claim 2, wherein the energy source is arranged on the security key or in the lock cylinder.

4. The locking apparatus as claimed in claim 3, wherein the control circuit on the security key comprises a voltage converter.

5. The locking apparatus as claimed in claim 4, wherein the voltage converter is switched off in the inoperative state and is switched on when the security key is inserted into the lock cylinder.

6. The locking apparatus as claimed in claim 2, wherein the key control circuit communicates with the cylinder control circuit in a bidirectional manner by means of the first and second contact elements.

7. The locking apparatus as claimed in claim 1, further comprising a control center in which the access data is stored and can be managed connected to the control circuit via the first and second communication paths.

8. The locking apparatus as claimed in claim 1, further comprising an RFID antenna connected to the control circuit on the security key in the second communication path directly via an interface connection.

9. The locking apparatus as claimed in claim 1, wherein the control circuit on the security key comprises a clock which can be read from and changed via the first and second communication paths.

10. The locking apparatus as claimed in claim 9, wherein at least one time window and/or at least one time zone can be determined by means of the clock.

11. The locking apparatus as claimed in claim 1, wherein the control circuit on the security key has data for at least one of the following functions: uniqueness number, access authorization, time zones, time windows, block lists/withdrawal of authorization, status information, history information, segmentation for data for third party users, and grouping of users.

12. The locking apparatus according to claim 1, wherein said electrical contact elements are contact plates.

* * * * *